（12) United States Patent
Holzmann et al.

(10) Patent No.: US 8,828,123 B2
(45) Date of Patent: Sep. 9, 2014

(54) AIR CLEANER WITH ENDCAP COVER

(75) Inventors: Mark V. Holzmann, Stoughton, WI (US); Rejeev Dhiman, Pune (IN); Kelly Ann Detra, Brooklyn, WI (US); Jim L. Alonzo, Verona, WI (US); Guy J. Moret, Sun Prairie, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 408 days.

(21) Appl. No.: 13/227,794

(22) Filed: Sep. 8, 2011

(65) Prior Publication Data
US 2012/0060453 A1 Mar. 15, 2012

Related U.S. Application Data

(60) Provisional application No. 61/381,640, filed on Sep. 10, 2010.

(51) Int. Cl.
*B01D 46/00* (2006.01)
*B01D 46/24* (2006.01)
*B01D 46/42* (2006.01)
*B01D 46/48* (2006.01)

(52) U.S. Cl.
CPC ...... *B01D 46/2414* (2013.01); *B01D 2265/026* (2013.01); *B01D 2265/021* (2013.01); *B01D 46/0005* (2013.01); *B01D 46/4272* (2013.01); *B01D 46/48* (2013.01); *B01D 2265/025* (2013.01); *B01D 2265/028* (2013.01)
USPC .................. 95/273; 55/428; 55/432; 55/480; 55/481; 55/498; 55/510

(58) Field of Classification Search
CPC ........... B01D 46/0005; B01D 46/2411; B01D 46/2414; B01D 46/48; B01D 2265/021; B01D 2265/025; B01D 2265/026; B01D 2265/027; B01D 2265/028
USPC .................. 55/480, 481, 498, 510, 428, 432; 95/273
See application file for complete search history.

(56) References Cited

U.S. PATENT DOCUMENTS

| | | | |
|---|---|---|---|
| 5,545,241 A * | 8/1996 | Vanderauwera et al. | 55/490 |
| 5,855,634 A * | 1/1999 | Berfield | 55/472 |
| 6,051,042 A | 4/2000 | Coulonvaux | |
| 6,398,838 B1 * | 6/2002 | Kaffenberger | 55/498 |
| 6,402,798 B1 | 6/2002 | Kallsen et al. | |
| 6,419,718 B1 * | 7/2002 | Klug et al. | 55/320 |
| 6,958,083 B1 | 10/2005 | Schmitz et al. | |
| 7,311,748 B2 * | 12/2007 | Holmes et al. | 55/498 |
| 7,740,678 B2 | 6/2010 | Gunderson et al. | |
| 7,976,602 B2 * | 7/2011 | Munkel | 55/498 |
| 8,202,341 B2 * | 6/2012 | Becker et al. | 55/498 |
| 2004/0134171 A1 | 7/2004 | Scott et al. | |
| 2007/0234903 A1 | 10/2007 | Xu et al. | |
| 2008/0276583 A1 * | 11/2008 | Munkel | 55/498 |
| 2009/0100813 A1 | 4/2009 | Iddings et al. | |

FOREIGN PATENT DOCUMENTS

WO 2006/119414 11/2006

* cited by examiner

*Primary Examiner* — Robert Clemente
(74) *Attorney, Agent, or Firm* — Foley & Lardner LLP

(57) ABSTRACT

An air cleaner includes a housing and an air filter element. An endcap of the air filter element provides a removable cover for the housing. The endcap includes removal, insertion, orientation, and retention structure and methods for same. A clamping arrangement is provided with minimal space requirements.

61 Claims, 5 Drawing Sheets

AIR CLEANER WITH ENDCAP COVER

CROSS REFERENCE TO RELATED APPLICATION

The present application claims the benefit of and priority from provisional U.S. Patent Application No. 61/381,640, filed Sep. 10, 2010, incorporated herein by reference.

BACKGROUND AND SUMMARY

The invention relates to air cleaners including air filter elements.

Air cleaners are known, including a housing extending axially along an axis and having an annular sidewall extending axially between first and second axial ends, the sidewall having an inlet receiving dirty incoming air, the first axial end having an outlet discharging clean filtered air, the second axial end being closable by a removable cover, the second axial end having a closed state when closed by the cover, the second axial end having an open state upon removal of the cover. An annular air filter element is axially insertable into the housing through the second axial end in the open state. The air filter element has an outer peripheral surface spaced inwardly of an interior surface of the sidewall of the housing and defining an annular dirty air inlet plenum therebetween receiving dirty air from the inlet. The air filter element has an inner peripheral surface defining a hollow interior providing a clean air outlet plenum supplying clean filtered air to the outlet. The air filter element includes annular filter media extending axially between the first and second endcaps. For further background, reference is made to the following U.S. patents, all incorporated herein by reference: U.S. Pat. Nos. 6,402,798; 6,958,083; 7,740,678.

The present disclosure arose during continuing development efforts in the above technology.

DETAILED DESCRIPTION

Figure 1:
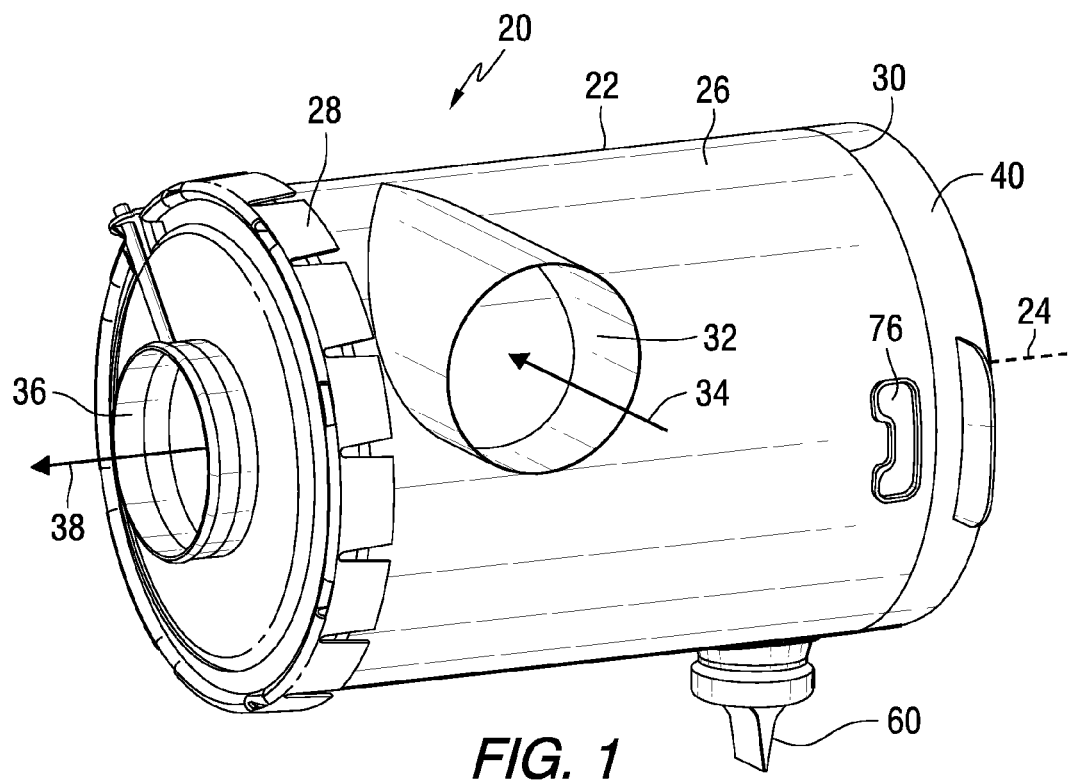
FIG. 1 is a perspective view of an air cleaner in accordance with the present disclosure.
Figure 2:
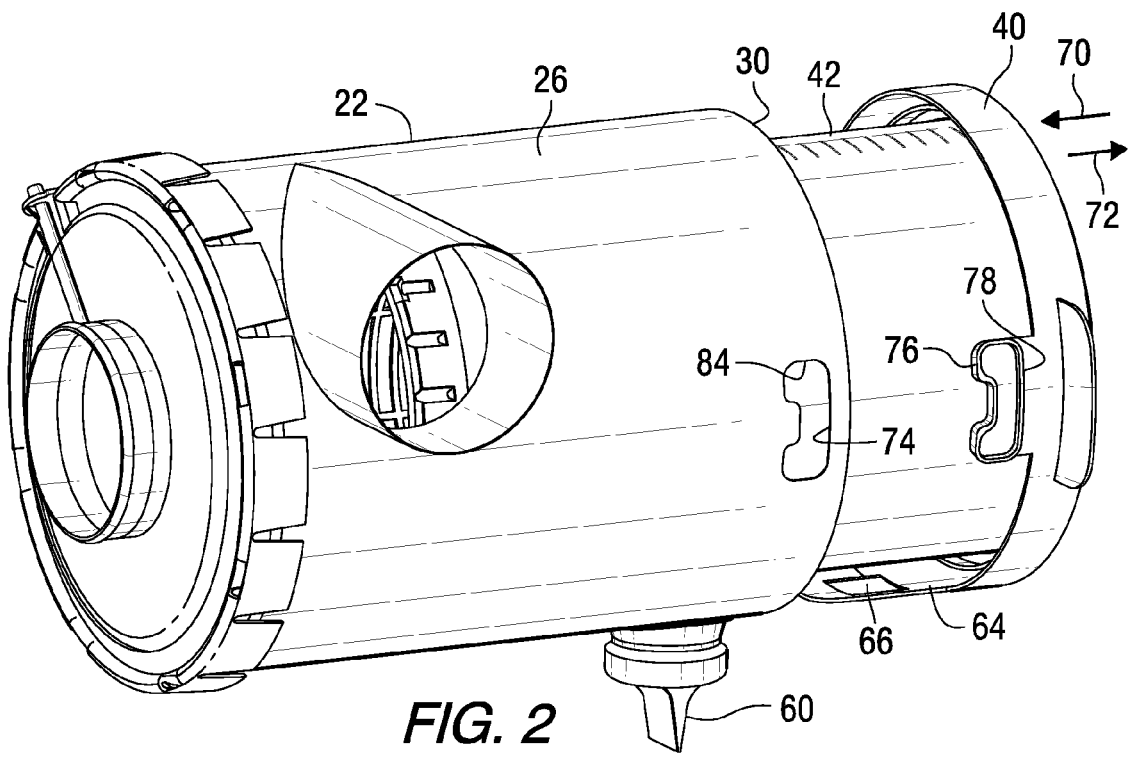
FIG. 2 is like FIG. 1 and shows a partially assembled view.
Figure 3:
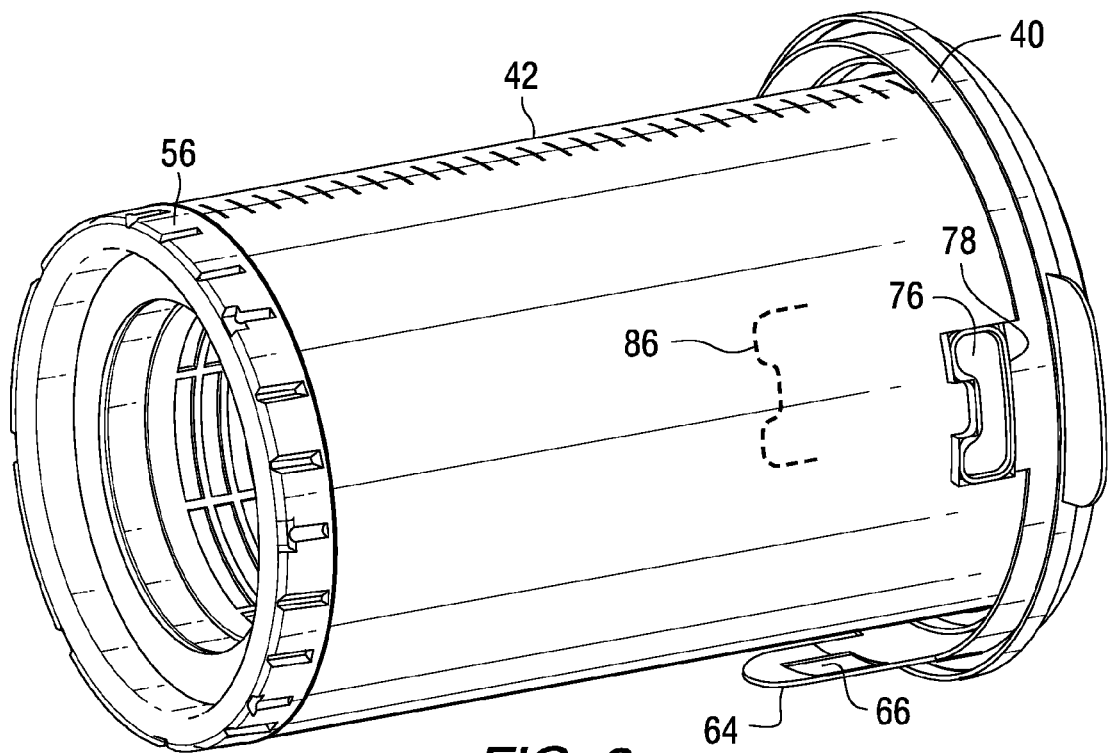
FIG. 3 is a perspective view of a component of FIG. 2.
Figure 4:
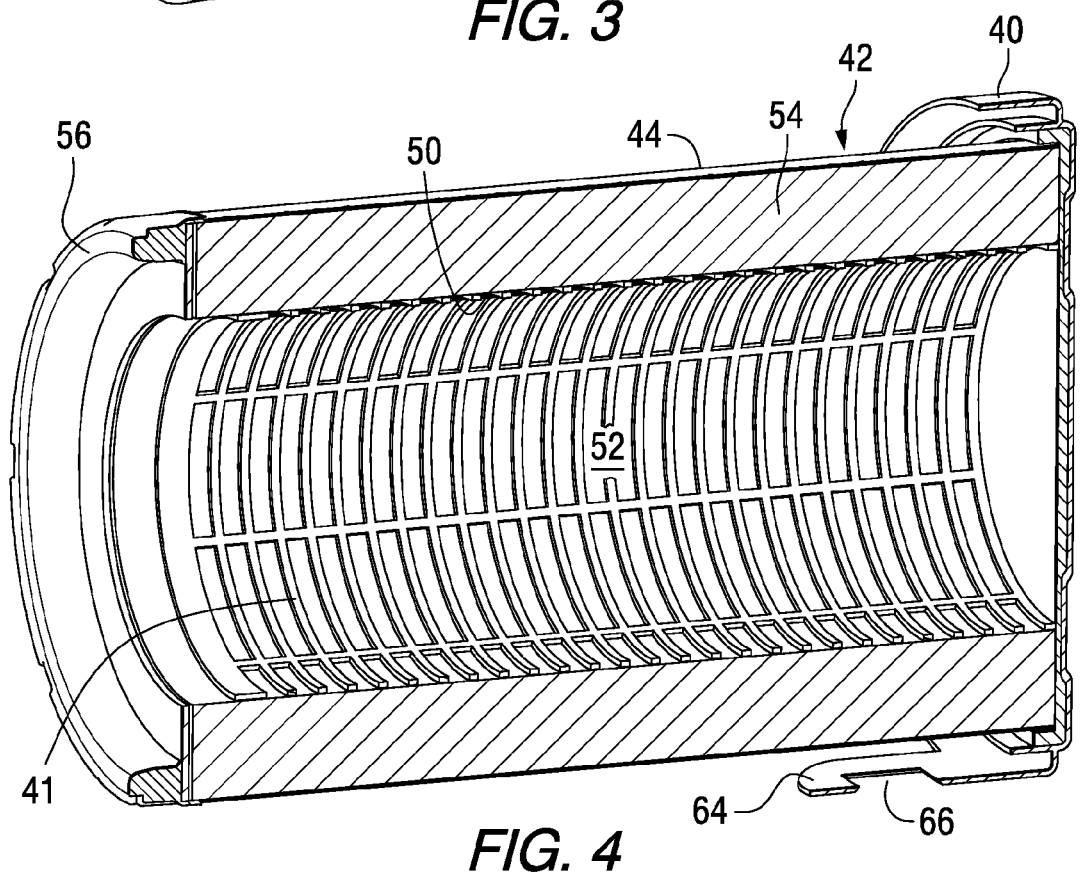
FIG. 4 is a sectional view of the component of FIG. 3.
Figure 5:
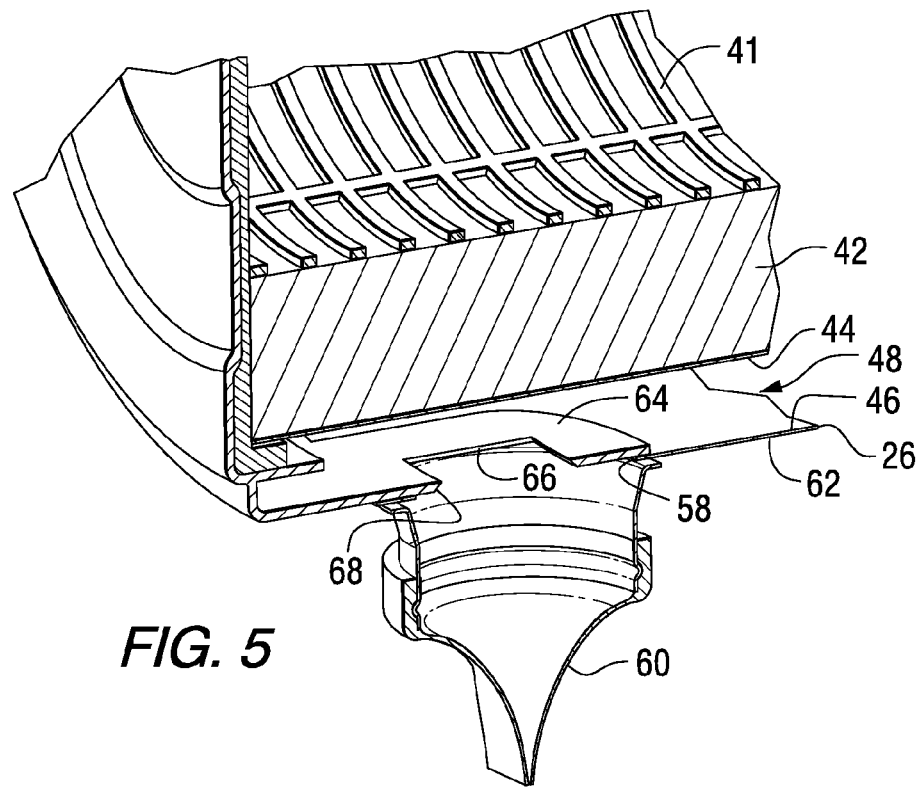
FIG. 5 is an enlarged view of a portion of FIG. 1.
Figure 6:
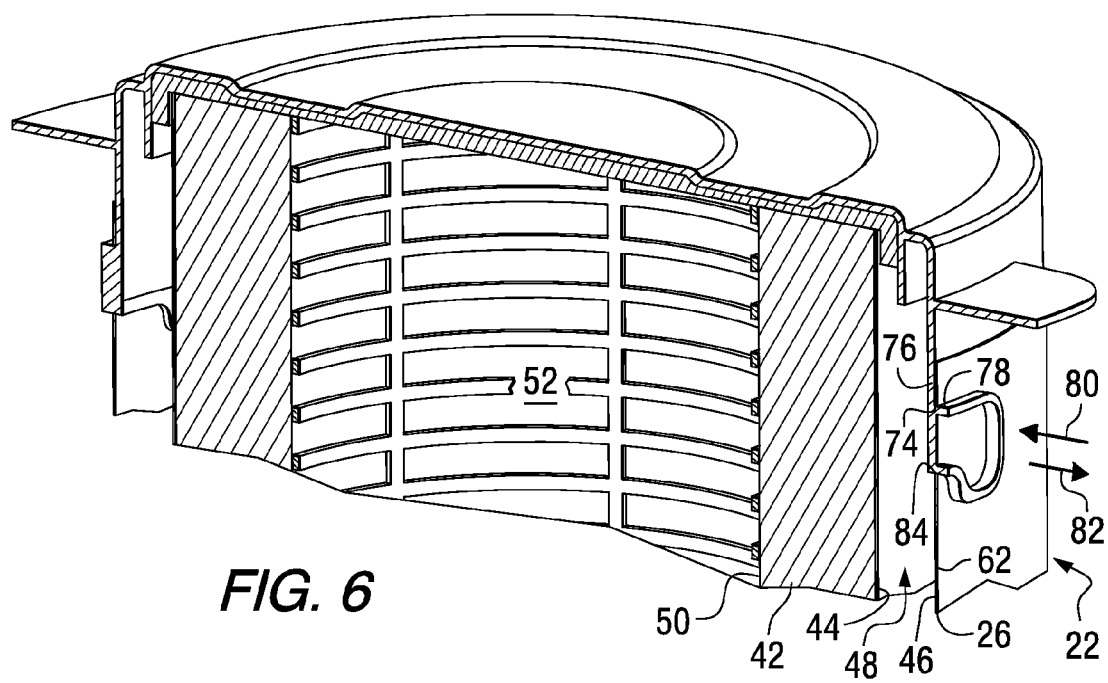
FIG. 6 is an enlarged view of another portion of FIG. 1.
Figure 7:
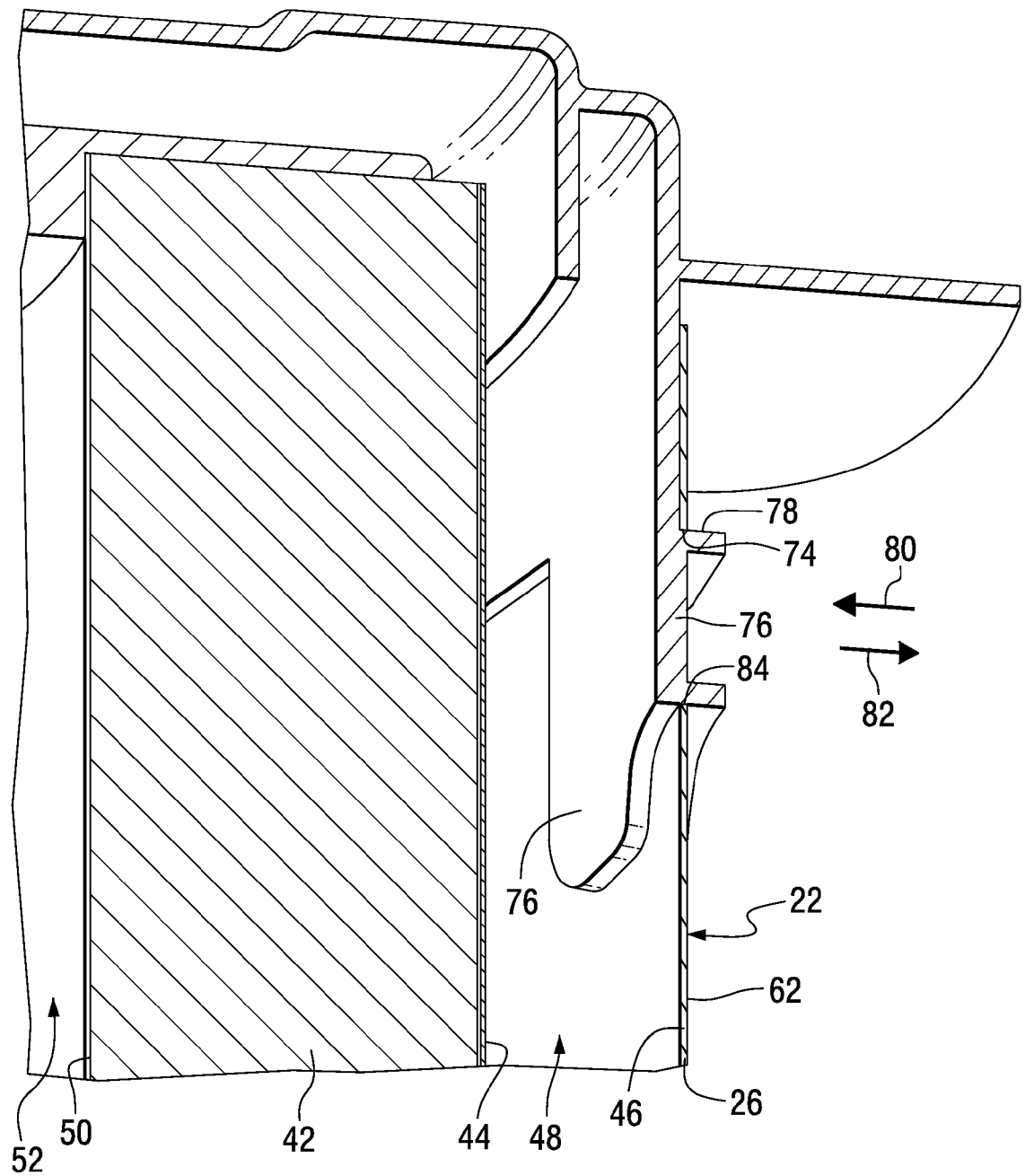
FIG. 7 is a view of the components of FIG. 6 from a different angle.

FIGS. 1-7 show an air cleaner 20 including a housing 22 extending axially along an axis 24 and having an annular sidewall 26 extending axially between first and second axial ends 28 and 30. Sidewall 26 has an inlet 32 receiving dirty incoming air as shown at arrow 34. First axial end 28 has an outlet 36 discharging clean filtered air as shown at arrow 38. Second axial end 30 is closable by a removable cover 40. Second axial end 30 has a closed state, FIG. 1, when closed by cover 40, and has an open state, FIG. 2, upon removal of cover 40. An annular air filter element 42, FIGS. 2-4, is axially insertable into the housing through second axial end 30 in the noted open state, FIG. 2. Air filter element 42 has an outer peripheral surface 44, FIG. 4, spaced inwardly of an interior surface 46, FIGS. 6, 7, of housing sidewall 26 and defining an annular dirty air inlet plenum 48 therebetween receiving dirty air from inlet 32. Air filter element 42 has an inner peripheral surface 50, FIG. 4, defining a hollow interior 52 providing a clean air outlet plenum supplying clean filtered air to outlet 36. Air filter element 52 includes annular filter media 54 extending axially between first and second axial endcaps 56 and 40. First endcap 56 faces outlet 36. Second endcap 40 is the noted cover.

Housing sidewall 26 has a dust ejection opening 58, FIGS. 2, 5-7, therethrough. A dust ejection valve 60 extends outwardly from exterior surface 62 of sidewall 26 and receives dust through opening 58 from inlet plenum 48. Dust ejection valve 60 may be a duckbill valve, as known in the art, or other dust ejection valves known in the art. Second endcap 40 includes a dust collection tab 64, FIGS. 2-5, extending along interior surface 46 of housing sidewall 26 to dust ejection opening 58. Dust collection tab 64 defines a dust ejection outlet port 66 from inlet plenum 48 through dust ejection opening 58 to dust ejection valve 60. Dust collection tab 64 has chamfered edges 68, FIG. 5, providing dust ejection outlet port 66. Dust collection tab 64 has an opening 66 therethrough aligned with dust ejection opening 58 through housing sidewall 26. Opening 66 through dust collection tab 64 provides the noted dust ejection outlet port from inlet plenum 48. In one embodiment, opening 66 through dust collection tab 64 is formed by an aperture through the dust collection tab, and dust ejection opening 58 is formed by an aperture through housing sidewall 26.

Air filter element 42 is inserted into housing 22 in a first axial direction 70, FIG. 2, toward first axial end 28, and is removed from housing 22 in a second axial direction 72 opposite to first axial direction 70. Housing sidewall 26 has at least one retention-stop surface 74, FIGS. 2, 6, 7, facing axially in first axial direction 70. Second endcap 40 includes at least one clamp tab 76 having a retention-engagement surface 78 facing axially in second axial direction 72. Retention-engagement surface 78 engages retention-stop surface 74 in latching relation upon insertion of air filter element 42 into housing 22 and clamps second endcap 40 to sidewall 26 and maintains second axial end 30 in the noted closed state, FIG. 1.

Clamp tab 76, FIGS. 2, 3, 6, 7, extends along interior surface 46 of housing sidewall 26 to retention-stop surface 74. Retention-engagement surface 78 of clamp tab 76 is released from latching engagement with retention-stop surface 74 of sidewall 26 by pushing retention-engagement surface 78 of clamp tab 76 radially inwardly as shown at arrow 80, FIGS. 6, 7, into inlet plenum 48. Retention-engagement surface 78 of clamp tab 76 engages retention-stop surface 74 of housing sidewall 26 in snap-fit relation. During axial insertion of air filter element 42 into housing 22 along the noted first axial direction 70, FIG. 2, clamp tab 76 slides axially along interior surface 46 of housing sidewall 26, and retention-engagement surface 78 snaps radially outwardly as shown at arrow 82, FIGS. 6, 7, into interference fit engagement with retention-stop surface 74 of sidewall 26. Retention-stop surface 74 is formed by a retention aperture 84 through housing sidewall 26. In one embodiment, second endcap 40 includes two identical clamp tabs 76, 86, the latter being shown in dashed line in FIG. 3 and being diametrically opposite clamp tab 76, each having a respective retention-engagement surface such as 78.

Figure 8:
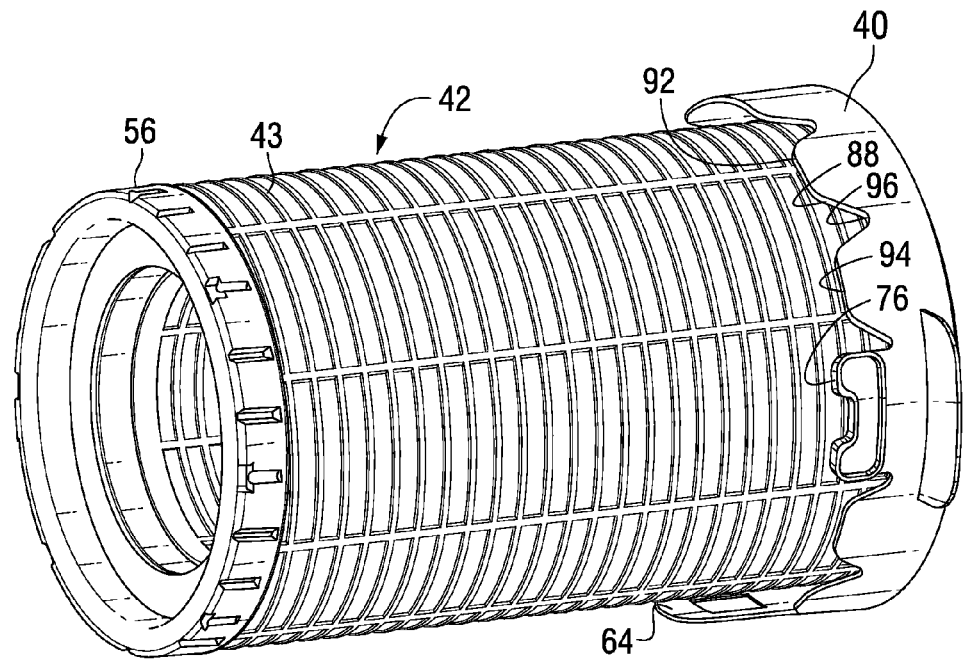
FIG. 8 is like FIG. 3 and shows another embodiment.
Figure 9:
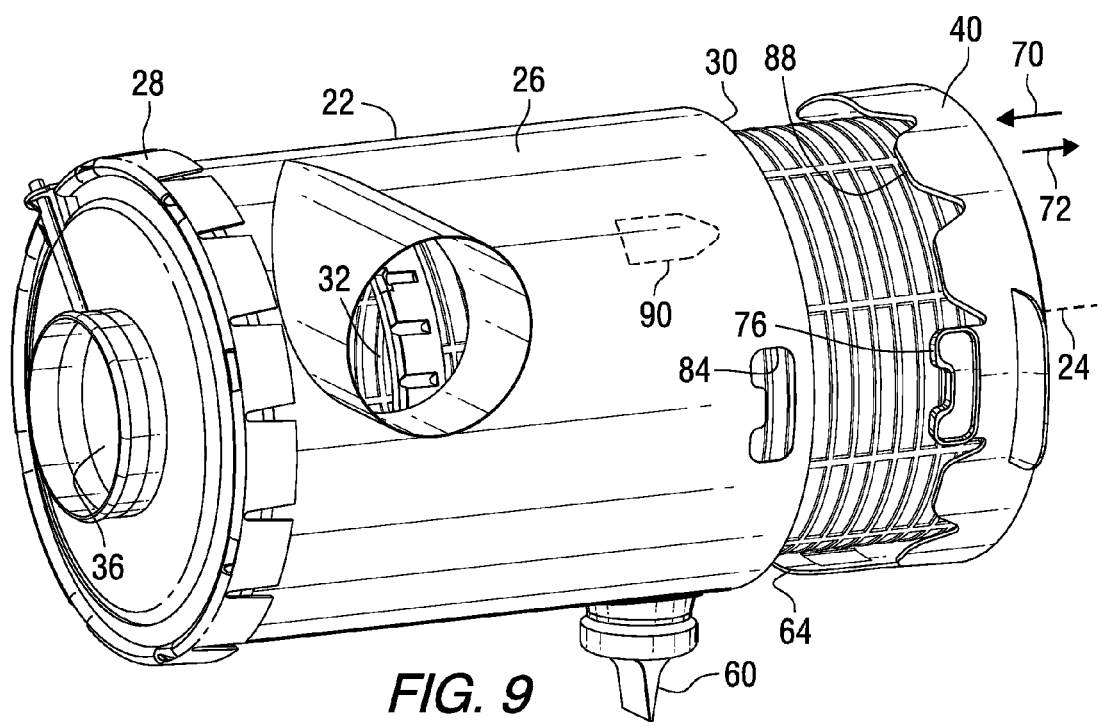
FIG. 9 is like FIG. 2 and further shows the embodiment of FIG. 8.

FIGS. 8, 9 illustrate another embodiment and use like reference numerals from above where appropriate to facilitate understanding. The air filter element may include an optional outer support grid or lattice-work 43 in addition to an optional inner support grid or lattice-work such as 41, FIG. 4. The air filter element is inserted into housing 22 in first axial direction 70 toward first axial end 28. Second endcap 40 extends axially along the filter media along the outer peripheral surface of the air filter element and has at least one cam surface 88 facing axially in the noted first axial direction 70. The interior surface of housing sidewall 26 has at least one alignment guide surface, as shown in dashed line at 90, facing in the noted second axial direction 72 and engageable by cam surface 88 of second endcap 40 during insertion of air filter element 42 into housing 22 in first axial direction 70 to cammingly rotate air filter element 42 about axis 44 during insertion, to a designated rotational orientation of air filter element 42 in housing 22 about axis 44. In one embodiment, endcap 40 has a scalloped terminating end 92 facing axially in the noted first axial direction 70 and having peaks 94 and valleys 96 with ramped surfaces 88 therebetween. The ramped surfaces provides a plurality of cam surfaces 88.

The present system provides an air filter element 42 for a housing 22, as described. The disclosure further provides a method for cleaning air including providing a housing 22 and an air filter element 42, as described. The method includes inserting the air filter element into the housing and clamping the air filter element to the housing with minimal space requirements around the exterior of the housing.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation. The noted annular shape includes circular, oval, elliptical, racetrack, oblong, and other closed-loop shapes.

What is claimed is:

1. An air cleaner comprising:
a housing extending axially along an axis and having an annular sidewall extending axially between first and second axial ends, said sidewall having an inlet receiving dirty incoming air, said sidewall having a dust ejection opening therethrough, said first axial end having an outlet discharging clean filtered air, said second axial end being closable by a removable cover, said second axial end having a closed state when closed by said cover, said second axial end having an open state upon removal of said cover;
an annular air filter element axially insertable into said housing through said second axial end in said open state, said air filter element having an outer peripheral surface spaced inwardly of an interior surface of said sidewall and defining an annular dirty air inlet plenum therebetween receiving dirty air from said inlet, said air filter element having an inner peripheral surface defining a hollow interior providing a clean air outlet plenum supplying clean filtered air to said outlet, said air filter element comprising annular filter media extending axially between first and second axial endcaps, said first endcap facing said outlet, said second endcap being said cover, said second endcap includes a dust collection tab extending along said interior surface of said sidewall to said dust ejection opening.

2. The air cleaner according to claim 1 wherein said sidewall includes a dust ejection valve extending outwardly from an exterior surface of said sidewall and receiving dust through said opening from said inlet plenum.

3. The air cleaner according to claim 1 wherein said dust collection tab defines a dust ejection outlet port from said inlet plenum through said dust ejection opening to said dust ejection valve.

4. The air cleaner according to claim 3 wherein said dust collection tab has chamfered edges providing said dust ejection outlet port.

5. The air cleaner according to claim 3 wherein said dust collection tab has an opening therethrough aligned with said dust ejection opening through said sidewall, said opening through said dust collection tab providing said dust ejection outlet port from said inlet plenum.

6. The air cleaner according to claim 5 wherein said opening through said dust collection tab is formed by an aperture through said dust collection tab.

7. The air cleaner according to claim 2 wherein said dust ejection opening is formed by an aperture through said sidewall.

8. The air cleaner according to claim 1 wherein said air filter element is inserted into said housing in a first axial direction toward said first axial end, said sidewall has at least one retention-stop surface facing axially in said first axial direction, said second endcap comprises at least one clamp tab having a retention-engagement surface facing axially in a second axial direction opposite to said first axial direction, wherein said retention-engagement surface engages said retention-stop surface in latching relation upon insertion of said air filter element into said housing and clamps said second endcap to said sidewall and maintains said second axial end in said closed state.

9. The air cleaner according to claim 8 wherein said clamp tab of said second endcap extends along said interior surface of said sidewall to said retention-stop surface.

10. The air cleaner according to claim 9 wherein said retention-engagement surface of said clamp tab is released from latching engagement with said retention-stop surface of said sidewall by pushing said retention-engagement surface of said clamp tab radially inwardly into said inlet plenum.

11. The air cleaner according to claim 10 wherein said retention-engagement surface of said clamp tab engages said retention-stop surface of said sidewall in snap-fit relation.

12. The air cleaner according to claim 11 wherein during axial insertion of said air filter element into said housing along said first axial direction, said clamp tab slides axially along said interior surface of said sidewall, and said retention-engagement surface snaps radially outwardly into interference fit engagement with said retention-stop surface of said sidewall.

13. The air cleaner according to claim 8 wherein said retention-stop surface is formed by a retention aperture through said sidewall.

14. The air cleaner according to claim 8 wherein said second endcap comprises two said clamp tabs each having a respective said retention-engagement surface.

15. The air cleaner according to claim 1 wherein said air filter element is inserted into said housing in a first axial direction toward said first axial end, said second endcap extends axially along said filter media along said outer peripheral surface of said air filter element and has at least one cam surface facing axially in said first axial direction.

16. The air cleaner according to claim 15 wherein said interior surface of said sidewall has at least one alignment guide surface facing in a second axial direction opposite to said first axial direction and engageable by said cam surface of said second endcap during insertion of said air filter element into said housing in said first axial direction to cammingly rotate said air filter element about said axis during said insertion to a designated rotational orientation of said air filter element in said housing about said axis.

17. The air cleaner according to claim 16 wherein said second endcap has a scalloped terminating end facing axially in said first axial direction and having peaks and valleys with ramped surfaces therebetween, said ramped surfaces providing a plurality of said cam surfaces.

18. An air filter element for an air cleaner having a housing extending axially along an axis and having an annular sidewall extending axially between first and second axial ends, said sidewall having an inlet receiving dirty incoming air, said sidewall having a dust ejection opening therethrough, said first axial end having an outlet discharging clean filtered air, said second axial end being closeable by a removable cover, said second axial end having a closed state when closed by said cover, said second axial end having an open state upon removal of said cover, said air filter element comprising:
an annular air filter element axially insertable into said housing through said second axial end in said open state, said air filter element having an outer peripheral surface spaced inwardly of an interior surface of said sidewall and defining an annular dirty air inlet plenum therebetween receiving dirty air from said inlet, said air filter element having an inner peripheral surface defining a hollow interior providing a clean air outlet plenum supplying clean filtered air to said outlet, said air filter element comprising annular filter media extending axially between first and second axial endcaps, said first endcap facing said outlet, said second endcap being said cover, said second endcap includes a dust collection tab extending along said interior surface of said sidewall to said dust ejection opening.

19. The air filter element according to claim 18 wherein said sidewall includes a dust ejection valve extending outwardly from an exterior surface of said sidewall and receiving dust through said opening from said inlet plenum.

20. The air filter element according to claim 19 wherein said dust collection tab defines a dust ejection outlet port from said inlet plenum through said dust ejection opening to said dust ejection valve.

21. The air filter element according to claim 20 wherein said dust collection tab of said second endcap of said air filter element has chamfered edges providing said dust ejection outlet port.

22. The air filter element according to claim 20 wherein said dust collection tab of said second endcap of said air filter element has an opening therethrough aligned with said dust ejection opening through said sidewall, said opening through said dust collection tab providing said dust ejection outlet port from said inlet plenum.

23. The air filter element according to claim 22 wherein said opening of said dust collection tab of said second endcap of said air filter element is formed by an aperture through said dust collection tab.

24. The air filter element according to claim 18 wherein said air filter element is inserted into said housing in a first axial direction toward said first axial end, said sidewall has at least one retention-stop surface facing axially in said first axial direction, said second endcap of said air filter element comprises at least one clamp tab having a retention-engagement surface facing axially in a second axial direction opposite to said first axial direction, wherein said retention-engagement surfaces engages said retention-stop surface in latching relation upon insertion of said air filter element into said housing and clamps said second endcap to said sidewall and maintains said second axial end in said closed state.

25. The air filter element according to claim 24 wherein said clamp tab of said second endcap of said air filter element extends along said interior surface of said sidewall to said retention-stop surface.

26. The air filter element according to claim 25 wherein said retention-engagement surface of said clamp tab of said second endcap of said air filter element is released from latching engagement with said retention-stop surface by pushing said retention-engagement surface of said clamp tab of said air filter element radially inwardly into said inlet plenum.

27. The air filter element according to claim 26 wherein said retention-engagement surface of said clamp tab of said second endcap of said air filter element engages said retention-stop surface in snap-fit relation.

28. The air filter element according to claim 27 wherein during axial insertion of said air filter element into said housing along said first axial direction, said clamp tab of said second endcap of said air filter element slides axially along said interior surface of said sidewall, and said retention-engagement surface of said clamp tab of said second endcap of said air filter element snaps radially outwardly into interference fit engagement with said retention-stop surface.

29. The air filter element according to claim 24 wherein said second endcap comprises two said clamp tabs each having a respective said retention-engagement surface.

30. The air filter element according to claim 18 wherein said air filter element is inserted into said housing in a first axial direction toward said first axial end, said second endcap of said air filter element extends axially along said filter media along said outer peripheral surface of said air filter element and has at least one cam surface facing axially in said first axial direction.

31. The air filter element according to claim 30 wherein said interior surface of said sidewall has at least one alignment guide surface facing in a second axial direction opposite to said first axial direction and engageable by said cam surface of said second endcap of said air filter element during insertion of said air filter element into said housing in said first axial direction to cammingly rotate said air filter element about said axis during said insertion to a designated rotational orientation of said air filter element in said housing about said axis.

32. The air filter element according to claim 31 wherein said second endcap of said air filter element has a scalloped terminating end facing axially in said first axial direction and having peaks and valleys with ramped surfaces therebetween, said ramped surfaces providing a plurality of said cam surfaces.

33. A method for cleaning air comprising:
providing a housing extending axially along an axis and having an annular sidewall extending axially between first and second axial ends, said sidewall having an inlet receiving dirty incoming air, said sidewall having a dust ejection opening therethrough, said first axial end having an outlet discharging clean filtered air, said second axial end being closable by a removable cover, said second axial end having a closed state when closed by said cover, said second axial end having an open state upon removal of said cover;
providing an annular air filter element axially insertable into said housing through said second axial end in said open state, said air filter element having an outer peripheral surface spaced inwardly of an interior surface of said sidewall and defining an annular dirty air inlet plenum therebetween receiving dirty air from said inlet, said air filter element having an inner peripheral surface defining a hollow interior providing a clean air outlet plenum supplying clean filtered air to said outlet;

providing said air filter element with annular filter media extending axially between first and second axial endcaps, facing said first endcap toward said outlet, said second endcap includes a dust collection tab extending along said interior surface of said sidewall to said dust ejection opening; and providing said second endcap as said cover.

34. The method according to claim 33 further comprising in combination a method for ejecting dust comprising providing said sidewall with a dust ejection valve extending outwardly from an exterior surface of said sidewall and receiving dust through said opening from said inlet plenum.

35. The method according to claim 34, further comprising providing at said dust collection tab a dust ejection outlet port from said inlet plenum through said dust ejection opening to said dust ejection valve.

36. The method according to claim 35 further comprising chamfering edges of said dust collection tab to provide said dust ejection outlet port.

37. The method according to claim 35 further comprising providing an opening through said dust collection tab aligned with said dust ejection opening through said sidewall, and providing said dust ejection outlet port from said inlet plenum at said opening through said dust collection tab.

38. The method according to claim 37 further comprising forming an aperture through said dust collection tab to provide said opening of said dust collection tab.

39. The method according to claim 34 further comprising forming an aperture through said sidewall to provide said dust ejection opening.

40. The method according to claim 33 further comprising in combination a method for inserting said air filter element into said housing and clamping said air filter element to said housing with minimal space requirements around the exterior of said housing, comprising inserting said air filter element into said housing in a first axial direction toward said first axial end, providing said sidewall with at least one retention-stop surface facing axially in said first axial direction, providing said second endcap with at least one clamp tab having a retention-engagement surface facing axially in said second axial direction opposite to said first axial direction, engaging said retention-engagement surface of said clamp tab of said second end cap with said retention-stop surface of said sidewall in latching relation upon insertion of said air filter element into said housing and clamping said second endcap to said sidewall and maintaining said second axial end in said closed state.

41. The method according to claim 40 further comprising extending said clamp tab of said second endcap along said interior surface of said sidewall to said retention-stop surface.

42. The method according to claim 41 further comprising releasing said retention-engagement surface of said clamp tab from latching engagement with said retention-stop surface of said sidewall by pushing said retention-engagement surface of said clamp tab radially inwardly into said inlet plenum.

43. The method according to claim 42 further comprising engaging said retention-engagement surface of said clamp tab with said retention-stop surface of said sidewall in snap-fit relation.

44. The method according to claim 43 further comprising, during axial insertion of said air filter element into said housing along said first axial direction, sliding said clamp tab axially along said interior surface of said sidewall, and snapping said retention-engagement surface radially outwardly into interference fit engagement with said retention-stop surface of said sidewall.

45. The method according to claim 40 further comprising forming a retention aperture through said sidewall to provide said retention-stop surface.

46. The method according to claim 40 further comprising providing said second endcap with two said clamp tabs each having a respective said retention-engagement surface.

47. The method according to claim 33 further comprising in combination a method for aligningly guiding axial insertion of said air filter element into said housing, comprising extending said second endcap axially along said filter media along said outer peripheral surface of said air filter element, providing said second endcap with at least one cam surface facing axially in said first axial direction, inserting said air filter element into said housing in a first axial direction toward said first axial end.

48. The method according to claim 47 further comprising providing said interior surface of said sidewall with at least one alignment guide surface facing in a second axial direction opposite to said first axial direction, engaging said alignment guide surface by said cam surface of said second endcap during insertion of said air filter element into said housing in said first axial direction to cammingly rotate said air filter element about said axis during said insertion to a designated rotational orientation of said air filter element in said housing about said axis.

49. The method according to claim 48 further comprising providing said second endcap with a scalloped terminating end facing axially in said first axial direction and having peaks and valleys with ramped surfaces therebetween, providing said ramped surfaces as a plurality of said cam surfaces.

50. An air cleaner comprising:
a housing extending axially along an axis and having an annular sidewall extending axially between first and second axial ends, the sidewall having an inlet receiving dirty incoming air, the first axial end having an outlet discharging clean filtered air, the second axial end being closable by a removable cover, the second axial end having a closed state when closed by the cover, the second axial end having an open state upon removal of the cover;
an annular air filter element axially insertable into the housing through the second axial end in the open state, the air filter element having an outer peripheral surface spaced inwardly of an interior surface of the sidewall and defining an annular dirty air inlet plenum therebetween receiving dirty air from the inlet, the air filter element having an inner peripheral surface defining a hollow interior providing a clean air outlet plenum supplying clean filtered air to the outlet, the air filter element comprising annular filter media extending axially between first and second axial endcaps, the first endcap facing the outlet, the second endcap being the cover, the second endcap has a cam surface facing axially in the first axial direction such that the cam surface engages an alignment guide surface of the interior surface of the sidewall during insertion of the air filter element into the housing in the first axial direction.

51. The air cleaner according to claim 50, wherein the air filter element is inserted into the housing in a first axial direction toward the first axial end, and the second endcap extends axially along the filter media along the outer peripheral surface of the air filter element.

52. The air cleaner according to claim 51 wherein during insertion of the annular filter element into the housing, the alignment guide surface and the cam surface engage to cammingly rotate the air filter element about the axis to a designated rotational orientation.

53. The air cleaner according to claim 52 wherein the second endcap has a scalloped terminating end facing axially in the first axial direction and having peaks and valleys with ramped surfaces therebetween, the ramped surfaces providing a plurality of the cam surfaces.

54. An air filter element for an air cleaner having a housing extending axially along an axis and having an annular sidewall extending axially between first and second axial ends, the sidewall having an inlet receiving dirty incoming air, the first axial end having an outlet discharging clean filtered air, the second axial end being closeable by a removable cover, the second axial end having a closed state when closed by the cover, the second axial end having an open state upon removal of the cover, the air filter element comprising:
an annular air filter element axially insertable into the housing through the second axial end in the open state, the air filter element having an outer peripheral surface spaced inwardly of an interior surface of the sidewall and defining an annular dirty air inlet plenum therebetween receiving dirty air from the inlet, the air filter element having an inner peripheral surface defining a hollow interior providing a clean air outlet plenum supplying clean filtered air to the outlet, the air filter element comprising annular filter media extending axially between first and second axial endcaps, the first endcap facing the outlet, the second endcap being the cover, the second endcap has a cam surface facing axially in the first axial direction such that the cam surface engages an alignment guide surface of the interior surface of the sidewall during insertion of the air filter element into the housing in the first axial direction.

55. The air filter element according to claim 54, wherein the air filter element is inserted into the housing in a first axial direction toward the first axial end, the second endcap of the air filter element extends axially along the filter media along the outer peripheral surface of the air filter element.

56. The air filter element according to claim 55, wherein during insertion of the air filter element into the housing, the alignment guide surface and the cam surface engage to cammingly rotate the air filter element about the axis to a designated rotational orientation.

57. The air filter element according to claim 56, wherein the second endcap of the air filter element has a scalloped terminating end facing axially in the first axial direction and having peaks and valleys with ramped surfaces therebetween, the ramped surfaces providing a plurality of the cam surfaces.

58. A method for cleaning air comprising:
providing a housing extending axially along an axis and having an annular sidewall extending axially between first and second axial ends, the sidewall having an inlet receiving dirty incoming air, the first axial end having an outlet discharging clean filtered air, the second axial end being closable by a removable cover, the second axial end having a closed state when closed by the cover, the second axial end having an open state upon removal of the cover;
providing an annular air filter element axially insertable into the housing through the second axial end in the open state, the air filter element having an outer peripheral surface spaced inwardly of an interior surface of the sidewall and defining an annular dirty air inlet plenum therebetween receiving dirty air from the inlet, the air filter element having an inner peripheral surface defining a hollow interior providing a clean air outlet plenum supplying clean filtered air to the outlet;
providing the air filter element with annular filter media extending axially between first and second axial endcaps, facing the first endcap toward the outlet;
providing the second endcap as the cover, the second endcap including a cam surface facing axially in a first axial direction;
inserting the air filter element into the housing in the first axial direction toward the first axial end such that the cam surface engages an alignment guide surface of the interior surface of the sidewall.

59. The method according to claim 58, further comprising extending the second endcap axially along the filter media along the outer peripheral surface of the air filter element.

60. The method according to claim 59, further comprising rotating the air filter element to a designated rotational orientation during insertion of the air filter element in the housing when the alignment guide surface engages the cam surface.

61. The method according to claim 60, further comprising providing the second endcap with a scalloped terminating end facing axially in the first axial direction and having peaks and valleys with ramped surfaces therebetween, providing the ramped surfaces as a plurality of the cam surfaces.

\* \* \* \* \*

UNITED STATES PATENT AND TRADEMARK OFFICE
CERTIFICATE OF CORRECTION

| | | |
|---|---|---|
| PATENT NO. | : 8,828,123 B2 | Page 1 of 1 |
| APPLICATION NO. | : 13/227794 | |
| DATED | : September 9, 2014 | |
| INVENTOR(S) | : Mark V. Holzmann et al. | |

It is certified that error appears in the above-identified patent and that said Letters Patent is hereby corrected as shown below:

Title page, item (75) under Inventors, second listed Inventor should read as -- Rajeev Dhiman --.

Signed and Sealed this
Eleventh Day of November, 2014

Michelle K. Lee
*Deputy Director of the United States Patent and Trademark Office*